United States Patent [19]

Cartwright et al.

[11] Patent Number: 5,172,792

[45] Date of Patent: Dec. 22, 1992

[54] MODULAR DISC BRAKE
[75] Inventors: Mark A. Cartwright, Rochester; Mark A. Korody; Patrick A. Thesier, both of Granger, all of Ind.
[73] Assignee: Allied-Signal, Inc., Morristown, N.J.
[21] Appl. No.: 720,349
[22] Filed: Jun. 25, 1991
[51] Int. Cl.$^5$ .............................................. F16D 55/00
[52] U.S. Cl. ................................... 188/71.1; 188/71.8
[58] Field of Search ................ 188/71.1, 71.8, 71.9, 188/72.4, 72.7, 72.9, 73.45, 73.47, 196 V, 196 D; 192/111 A, 70.23

[56] References Cited

U.S. PATENT DOCUMENTS

| | | | |
|---|---|---|---|
| Re. 29,582 | 3/1978 | Brown | 188/73.3 |
| Re. 30,255 | 4/1980 | Rath et al. | 188/73.3 |
| 2,790,515 | 4/1957 | Hawley | 188/72 |
| 2,817,419 | 12/1957 | Wolf | 188/72 |
| 2,888,103 | 5/1959 | Armstrong | 188/72 |
| 2,888,104 | 5/1959 | Frayer | 188/73 |
| 2,900,052 | 8/1959 | Frayer et al. | 188/73 |
| 2,997,138 | 8/1961 | Cagle | 188/73 |
| 3,019,859 | 2/1962 | Marsh | 188/72 |
| 3,064,765 | 11/1962 | Dotto | 188/73 |
| 3,155,200 | 11/1964 | Halibrand | 188/196 |
| 3,199,635 | 8/1965 | Bessler et al. | 188/73 |
| 3,245,500 | 4/1966 | Hambling et al. | 188/73.47 |
| 3,542,159 | 11/1970 | Kestermeier | 188/72.6 |
| 3,580,362 | 5/1971 | Fair | 188/73.47 |
| 3,592,301 | 7/1971 | Auth | 188/73.6 |
| 3,701,398 | 10/1972 | Martins | 188/71.8 |
| 3,703,944 | 11/1972 | Hendrickson | 188/72.2 |
| 3,835,960 | 9/1974 | Moss | 188/71.9 |
| 3,889,785 | 6/1975 | Hori | 188/73.3 |
| 3,997,032 | 12/1976 | Kondo | 188/72.4 |
| 4,003,453 | 1/1977 | Mathias | 188/72.4 |
| 4,061,209 | 12/1977 | Gee et al. | 188/73.45 |
| 4,068,745 | 1/1978 | Haraikawa | 188/73.45 |
| 4,106,595 | 8/1978 | Kimura et al. | 188/73.3 |
| 4,313,526 | 2/1982 | Farr | 188/72.4 |
| 4,335,806 | 6/1982 | Lüpertz | 188/73.33 |
| 4,360,079 | 11/1982 | Belart | 188/73.34 |
| 4,433,757 | 2/1984 | Warwick et al. | 188/1.11 |
| 4,611,693 | 9/1986 | Wang | 188/73.34 |
| 4,660,684 | 4/1987 | Carré et al. | 188/71.9 |
| 4,719,997 | 1/1988 | Tsuruta | 188/71.9 |
| 4,744,286 | 5/1988 | Gerard | 92/13.1 |
| 4,779,711 | 10/1988 | Fabbro et al. | 188/196 D |
| 4,784,245 | 11/1988 | Fabbro et al. | 188/196 D |

FOREIGN PATENT DOCUMENTS

0029916  6/1981  European Pat. Off.
58-61340  12/1983  Japan .................... 188/73.47

Primary Examiner—Robert J. Oberleitner
Assistant Examiner—Chris Schwartz
Attorney, Agent, or Firm—Larry J. Palguta; Ken C. Decker

[57] ABSTRACT

The disc brake (10, 210) comprises a support member (12, 212) having circumferentially spaced apart pin support portions (16, 18; 216, 218) with pin openings (20, 24). A cordal type carrier having inboard (32, 232), outboard (34, 234), and circumferentially spaced apart sides (36, 236; 38, 238) is mounted slidably by pins (22, 28; 222, 228) on the support member (12, 212). The pins extend slidably through the pin openings (20, 24) and are each fixed to the carrier (30, 230). One (22, 222) of the pins (22, 28; 222, 228) has a larger diameter than the other (28, 228) of the pins (22, 28; 222, 228), and the smaller diameter pin (28) has disposed thereabout an axially extending and slidable sleeve member (26). The axially extending sleeve member (26) receives the smaller pin (28, 228) within an eccentrically aligned through opening (27), the through opening (27) having a reduced diameter portion at an axially central portion (29) thereof in order to provide the disc brake (10, 210) with a three-point mounting that effects parallelism of the pins (22, 28) relative to one another. The carrier (30, 230) includes a central, axially extending opening (40, 240) with laterally extending axial rails (37, 39) at each circumferential side of the opening (40, 240). Each of the rails (37, 39) includes a pair of radially extending through slots (37B, 37BB; 39A, 39AA). The piston housing (60, 260) has circumferentially extending side arms (61AA, 61BB, 66AA, 66BB) which are received during assembly within respective slots (37B, 39A, 37BB, 39AA) and then slide recesses (62, 64) of the housing (60, 260) receive the rails (37, 39) to permit the housing (60, 260) to slide thereupon. Each of the brake pads (70, 76; 270, 276) has similar circumferential recesses (75, 77) which receive and slide upon the rails (37, 39). Each of the rails (37, 39) contains a slider (50) to increase sliding of the piston housing (60, 260) and brake pads (70, 76; 270, 276) relative to the carrier (30, 230).

32 Claims, 8 Drawing Sheets

MODULAR DISC BRAKE

The present invention relates to a modular disc brake, and in particular to a modular disc brake having a piston housing that is removable from an associated carrier.

Numerous types of disc brakes have been proposed for many types of vehicle applications. Disc brake designs that have proved successful are typically those that may be applied to a large range of vehicles. Design modifications, if any, are relatively minor so that the basic disc brake construction may be applied to numerous vehicles. It is highly desirable to provide such a brake which may be easily modified so that the basic concept of the brake is applied to a wide variety of vehicles. The disc brake should have a very strong structure, and yet be light weight. The disc brake should include a mechanism for lining wear adjustment and high pressure compensation, and yet be simple and easily manufactured to provide such mechanisms which should be highly reliable. The disc brake should have a parking brake feature that is simple and inexpensive, and yet highly reliable and efficient in its operation. The disc brake should not be subject to loud klunking noises as the parts interact with one another, and therefore should include an anti-rattle mechanism. The disc brake should include a structure for mounting the slidable portion of the brake such that there is compensation for manufacturing tolerances. The disc brake should be mounted so that the locating and slide components remain parallel to one another and therefore keep the components from deforming or binding which can restrict the slidable movement of the disc brake.

The present invention provides solutions to all of the above problems by providing a modular disc brake, comprising a support member having a central opening and a pair of pin support portions with pin openings, a carrier slidably attached to the support member by means of two pins, the carrier straddling the pin support portions and receiving fixedly both of said pins, one of said pins having a larger diameter than the other of said pins, the larger diameter pin extending through and slidably received within said associated pin opening, the other of said pins extending through and slidably received within the associated pin opening by means of a sleeve member, the sleeve member having a through opening receiving the other pin and the through opening being disposed eccentrically relative to a central longitudinal axis of said sleeve, the through opening narrowing at a central axial portion of said sleeve to provide substantially a point of contact with said other pin, the carrier member having inboard and outboard sides and circumferentially spaced apart sides to form an interior housing opening, a piston housing comprising a module received slidably by said carrier within said carrier opening, one of said carrier and piston housing having slide abutments and the other of said carrier and piston housing having slide recesses.

The invention is described in detail below with reference to the drawings which illustrate.

Figure 1:
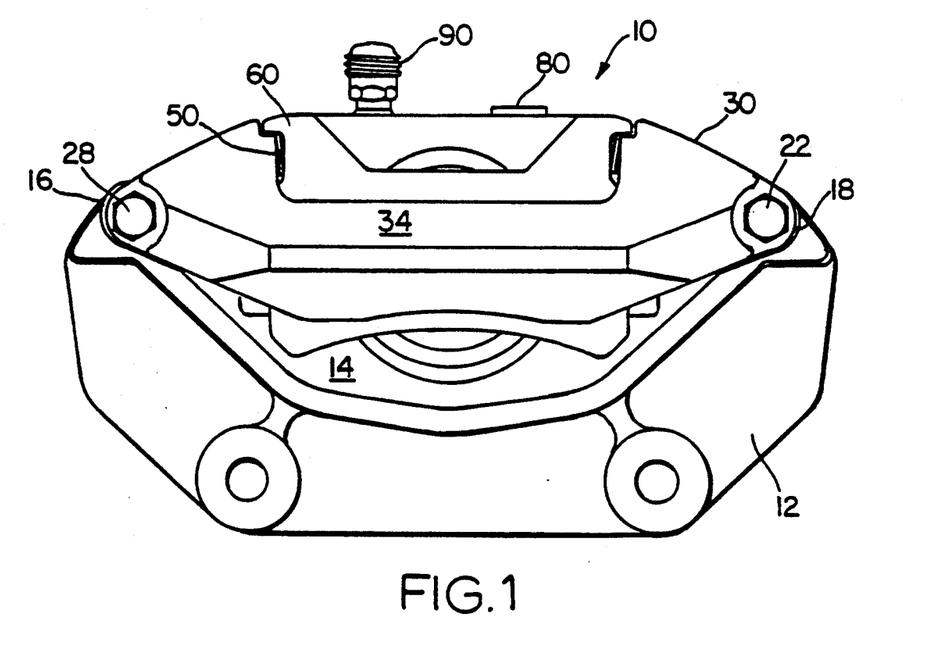
FIG. 1 is an outboard side view of the modular disc brake in accordance with the present invention.
Figure 2:
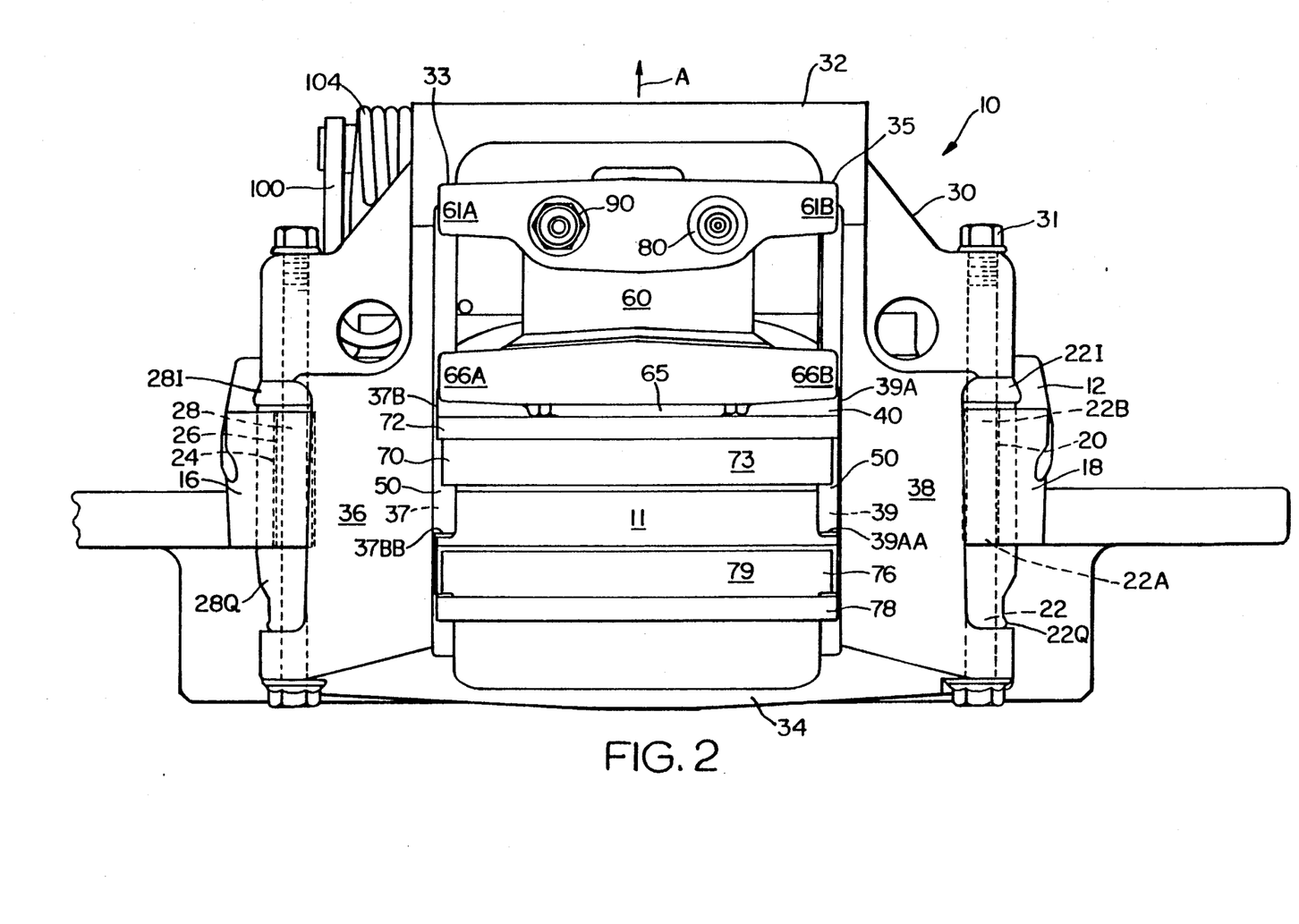
FIG. 2 is a top view of the modular disc brake in accordance with the present invention.
Figure 10:
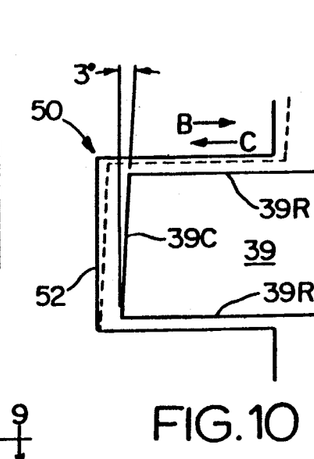
FIG. 10 is a schematic illustration of a slider mounted on a slide abutment or rail member of the carrier.
Figure 11:
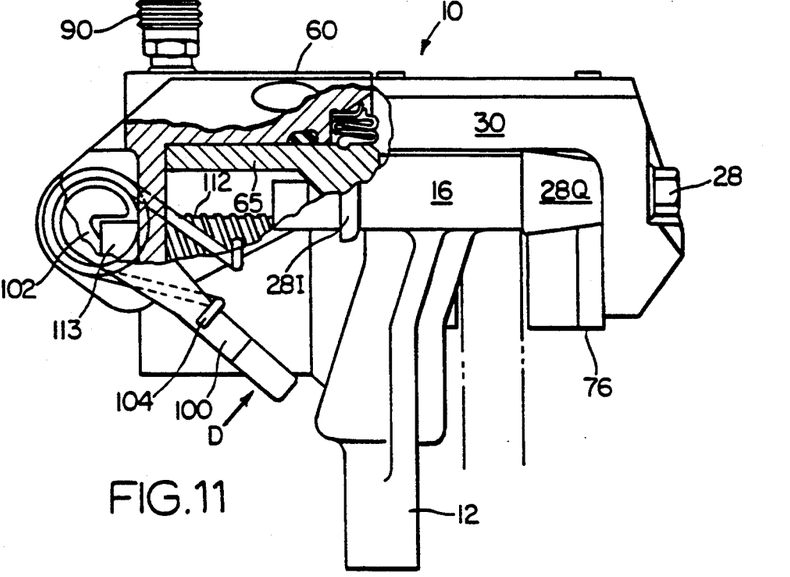
FIG. 11 is an end view of the modular disc brake with a partial cut-away illustrating portions of the parking brake mechanism and lining wear adjustment mechanism.
Figure 18:
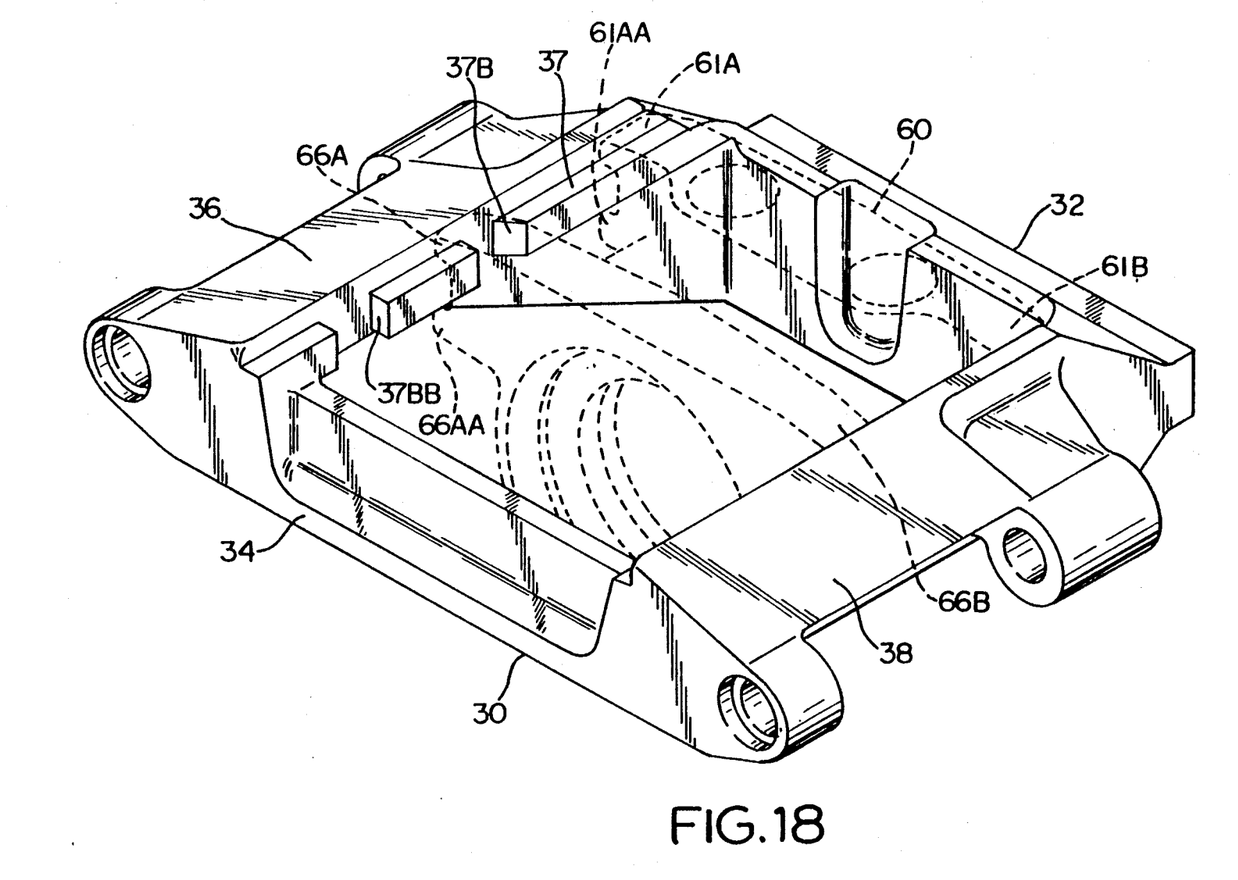
FIG. 18 illustrates the carrier with the piston housing in dotted line outline mounted on the rail members.

The modular disc brake of the present invention is designated generally by reference numeral 10 in FIGS. 1, 2 and 11. Modular disc brake 10 includes support member 12 that may be mounted directly to a knuckle or mounted via an adapter plate. Support member 12 includes a central circumferentially extending opening 14 bounded at each side by pin support portions 16 and 18. Pin support portions 16 and 18 extend axially over an outer circumferential edge of a rotor 11 (see FIG. 2). Pin support portion 18 includes through pin opening 20 which receives therein large diameter pin 22. Pin support portion 16 includes through pin opening 24 which includes therein compensating sleeve member 26 and small diameter pin 28. Each of the pins is attached fixedly to carrier 30 by means of nuts 31, and permits the carrier to slide relative to the respective pin support portion 16, 18. Alternatively, pins 22 and 28 may be threaded into threads in the carrier 30, or a threaded insert may be located in the carrier to receive the threads of the pins. Pin 22 has pin boots 22I and 22Q and pin 28 has pin boots 28I and 28Q. Carrier 30 comprises an integral aluminum member having inboard side 32 and outboard side 34 and circumferentially spaced apart sides 36 and 38 (see FIG. 18). Sides 32, 34, 36, and 38 bound a central axially extending housing and pad opening 40 which receives slidable piston housing 60. Circumferentially spaced apart sides 36 and 38 each include an axially extending respective slide abutment, rail or rail member 37, 39 which is received within a respective slide recess 62 and 64 of piston housing 60. Located on each rail 37 and 39 is a brake pad slider 50 (see FIG. 18) illustrated in FIGS. 7-10 and described in detail below. Slider 50 increases the ability of identical brake pads 70, 76 and piston housing 60 to slide relative to the carrier, while providing an anti-corrosion sliding surface and retention of the outer brake pad 76 and piston housing 60.

Figure 3:
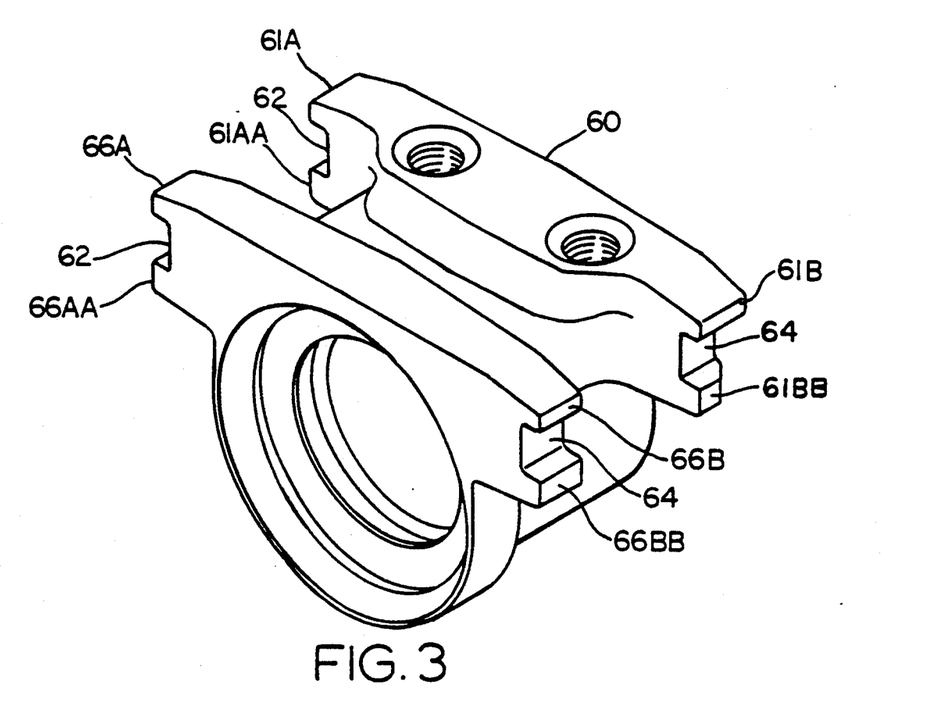
FIG. 3 is an isometric view of the piston housing.
Figure 4:
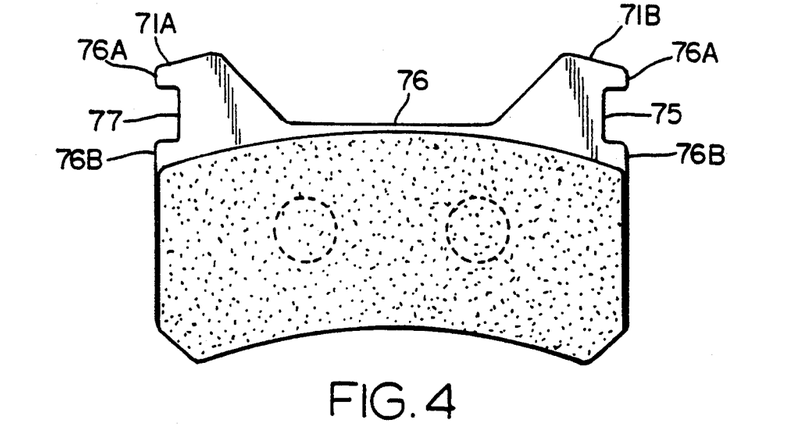
FIG. 4 is a view of one of the disc brake pads.

Referring to FIGS. 2-4, piston housing 60 comprises a generally square-shaped aluminum housing which includes an aluminum piston that is extendable outwardly of the housing to engage in inner brake pad 70 which comprises backing plate 72 and friction material 73. Identical outer brake pad 76 comprises backing plate 78 and friction material 79. Each of the backing plates 72, 78 includes recesses 75, 77 (see FIG. 4) which receive associated rails 37, 39 and sliders 50. When hydraulic brake pressure is transmitted to inlet fitting 80, hydraulic pressure within the piston housing displaces piston 65 outwardly against inner brake pad 70 which engages rotor 11. By reaction, carrier 30 is displaced in the direction of Arrow A in FIG. 2, and brings outer brake pad 76 into engagement with the opposite face of the rotor. The piston housing includes bleed screw 90 located in approximate axial alignment with circumferentially extending upper arms 61A and 61B. Axially spaced apart are circumferentially extending upper arms 66A and 66B. Carrier rails 37, 39 each include a pair of respective mirror image radial slots 37B, 37BB (see FIG. 18) and 39A and 39AA. The piston housing is assembled to carrier 30 by placing it within carrier opening 40 such that lower circumferential arms 61AA and 61BB pass through slots 37B and 39A as lower circumferential arms 66AA and 66BB pass through radial slots 37BB and 39AA. Piston housing 60 is moved axially toward inboard carrier side 32 so that housing slide recesses 62, 64 receive rails 37, 39 and circumferential arm portions 61A, 61AA and 61B, 61BB abut the carrier at stop portions 33 and 35, respectively. Likewise, inner and outer brake pads 70 and 76 each have upper circumferentially extending arms (71B and 71A of pad 76 in FIG. 4) whereby the lower portion of illustrated pad 76 is passed through respective slots 37BB and 39AA so that outer brake pad 76 abuts outboard side 34. Likewise, inner brake pad 70 is located axially adjacent piston 65.

Figure 5A:
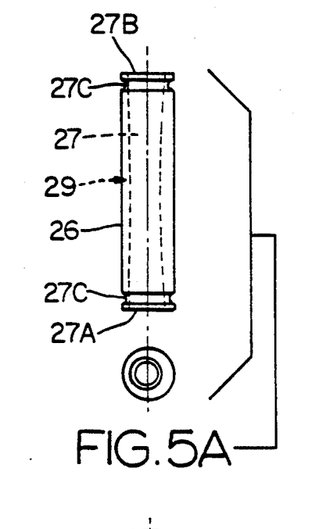
FIGS. 5A-5C are views of the compensating sleeve utilized about the smaller of two support pins.
Figure 5B:
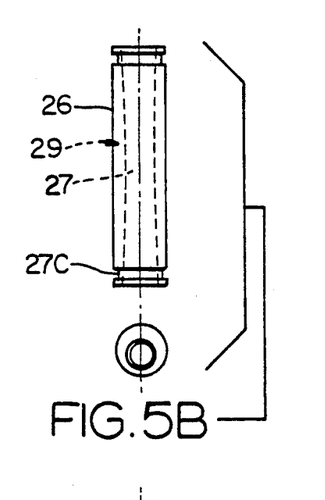
Figure 5C:
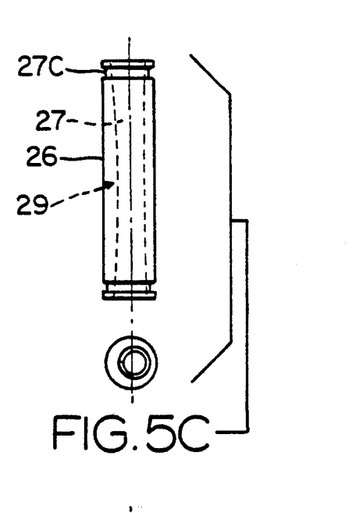
Figure 6A:
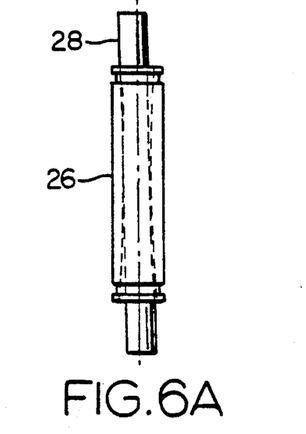
FIGS. 6A-6C are schematic illustrations of the reception of the smaller of two support pins within the compensating sleeve in order to provide a parallel alignment between the sleeve and larger support pin.
Figure 6B:
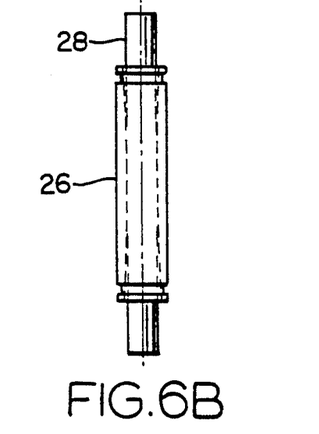
Figure 6C:
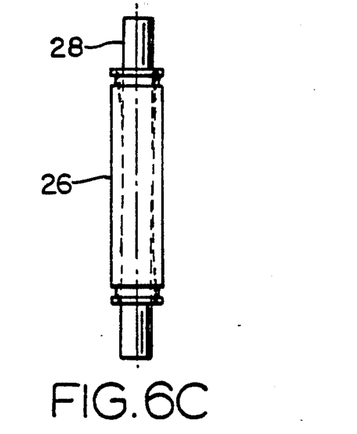

Referring to FIGS. 5A-5C and 6A-6C, compensating sleeve 26 and its engagement with small diameter pin 28 is illustrated schematically in greater detail. FIG. 5A illustrates sleeve 26 which includes axial and eccentric through opening 27 that is disposed eccentrically relative to longitudinal centerline A—A, and pin boot receptacle grooves 27C. Additionally, through opening 27 narrows or has a smaller diameter at the central portion designated generally by reference numeral 29. The result is that longitudinal through opening 27 has a generally "hourglass" axial shape whereby central axial portion 29 has a smaller diameter than axial end openings 27A and 27B. Also, as seen from a comparison of FIGS. 5A, 5B and 5C, longitudinal opening 27 is located eccentrically relative to centerline A—A and the sleeve may be rotated to numerous rotational positions so that eccentric opening 27 compensates for manufacturing tolerances and permits pins 28 and 22 to be located easily within the respective pin openings and attached to carrier 30. Eccentric through opening 27 may be located in different rotational positions because of the ability of compensating sleeve 26 to rotate within pin opening 24. FIGS. 6A-6C illustrate how compensating sleeve 26 permits the sliding means or slider mechanism (pins 22 and 28 and sleeve 26) of the brake to be maintained in parallel alignment during operation of the brake. Large diameter pin 22 (see FIG. 2) is mounted within pin opening 20 of support portion 18, while small diameter pin 28 is located within hourglass-shaped and eccentric longitudinal opening 27 of sleeve 26. Pin 28 does not slide axially relative to sleeve 26 which can rotate and slide axially within pin opening 24. Because end openings 27A and 27B of sleeve 26 are larger than the diameter of pin 28, pin 28 engages sleeve 26 at central axial portion 29. The result is that large diameter pin 22 has two contact areas 22A and 22B (see FIG. 2) with support portion 18 while small diameter pin 28 has a single contact area at central axial portion 29 of sleeve 26. The result is a three-point contact or mounting of pins 22, 28 relative to one another which permits the sliding mechanism or means of the brake constituting the large diameter pin 22 and the assembly of the small diameter pin 28 and compensating sleeve 26 to remain in parallel alignment with one another despite any nonparallel alignment of the pins relative to one another. This continuous parallelism between pin 22 and sleeve 26 increases substantially the ability of carrier 30 to slide relative to support 12, wherein minor misalignments of carrier 30 will not cause the sliding means to be in nonparallel alignment and inhibit sliding. FIG. 6B illustrates pin 28 in parallel alignment with sleeve 26 (and also with not shown pin 22), and FIG. 6A illustrates pin 28 in a nonparallel alignment with sleeve 26 (and also with not shown pin 22) and which is opposite to the nonparallel alignment illustrated in FIG. 6C. Because of its ability to rotate and to slide axially relative to the pin opening 24, sleeve 26 compensates for any displacement of pin 28 which causes pin 28 to be in nonparallel alignment with the sleeve and/or pin 22, such that the ability of carrier 30 to slide relative to support member 12 is not degraded.

Figures 7, 8:
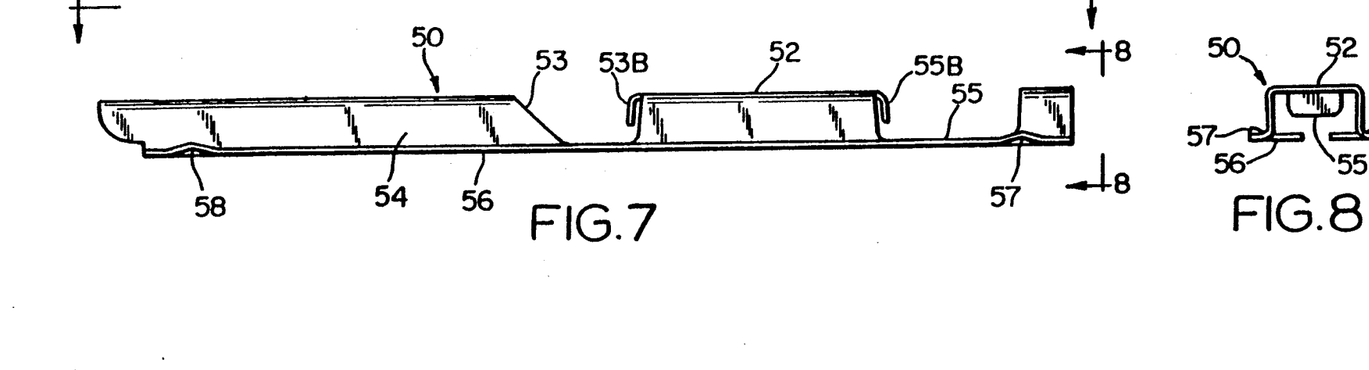
FIG. 7 is a side view of a slider mounted on the rails of the disc brake.
FIG. 8 is a view taken along view line 8-8 of FIG. 7.
Figure 9:
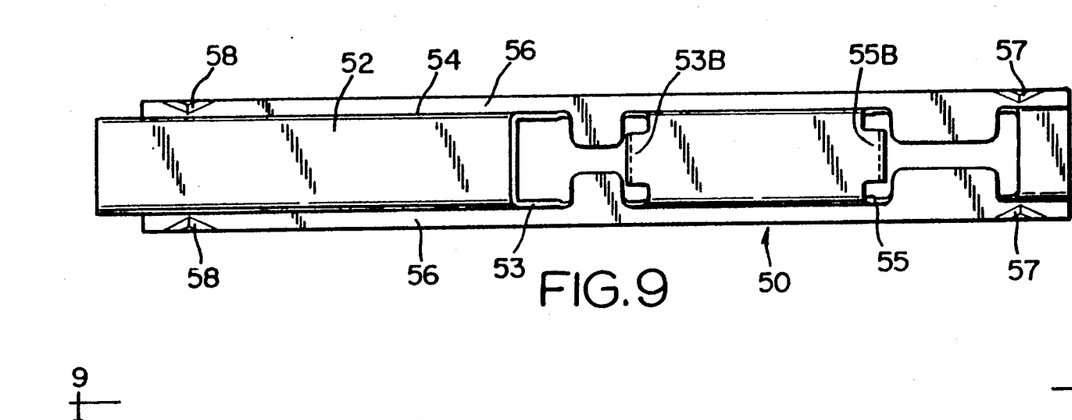
FIG. 9 is a view taken along view line 9—9 of FIG. 7.

Referring now to FIGS. 7-9, brake pad slider or cap 50 will be described in greater detail. As illustrated in FIG. 8, each slider 50 comprises a generally U-shaped or hat shaped stainless steel member which extends axially and snap-fits to rails 37, 39. Each slider 50 includes top portion 52 with angled side portions 54 and slide flanges 56. Slider 50 does not have a left- and right-hand orientation, and therefore it may be used on both rails 37 and 39. Each slider 50 includes an axially spaced apart pair of slot openings 53 and 55 which align with slot openings 37B, 37BB and 39A, 39AA. Slot opening 53 has adjacent thereto tab 53B and slot opening 55 has adjacent thereto tab 55B. Tabs 53B, 55B extend into slots 37B, 37BB, and 39A, 39AA of the respective rails in order to position axially slider 50. Side portions 54 are angled slightly toward one another so that sliders 50 are snap-fitted on rails 37, 39. Flanges 56 each have two detent protrusions 57 and 58 for retaining, respectively, outer brake pad 76 and piston housing 60 in axial position relative to carrier 30. As outer brake pad 76 is moved axially outwardly into engagement with outboard side 34 during assembly of the brake, the upper and lower radial surfaces 76A and 76B (FIG. 4) engage detent protrusions 57 so that brake pad 76 will not slide axially toward rotor 11. Likewise, piston housing 60 when moved axially into position against abutment portions 33, 35, has the radial sides of each circumferential arm portion 61A, 61AA and 61B, 61BB engaging respective detent protrusions 58 so that piston housing 60 does not slide axially forward toward rotor 11.

Referring to FIG. 10, schematically illustrated connecting rail surface 39C of rail 39 is disposed at an angle of approximately 3° relative to a line located perpendicular to the upper and lower circumferentially extending radial surfaces 39R. Because connecting surface 39C extends at the angle, when slider 50 is mounted thereon and piston housing and brake pads assembled to the brake, top portion 52 of slider 50 is biased or bent in the direction of Arrow B, as shown by the dotted line outline of the bent portions of the slider. This provides a reaction force in the direction of Arrow C against the piston housing 60 and brake pads 70, 76 which prevents rattling thereof. The same structure is present at rail 37 and the associated slider 50. Thus, carrier 30 through the structure of rails 37, 39 and sliders 50 provides a "built in" anti-rattle device.

Figure 12:
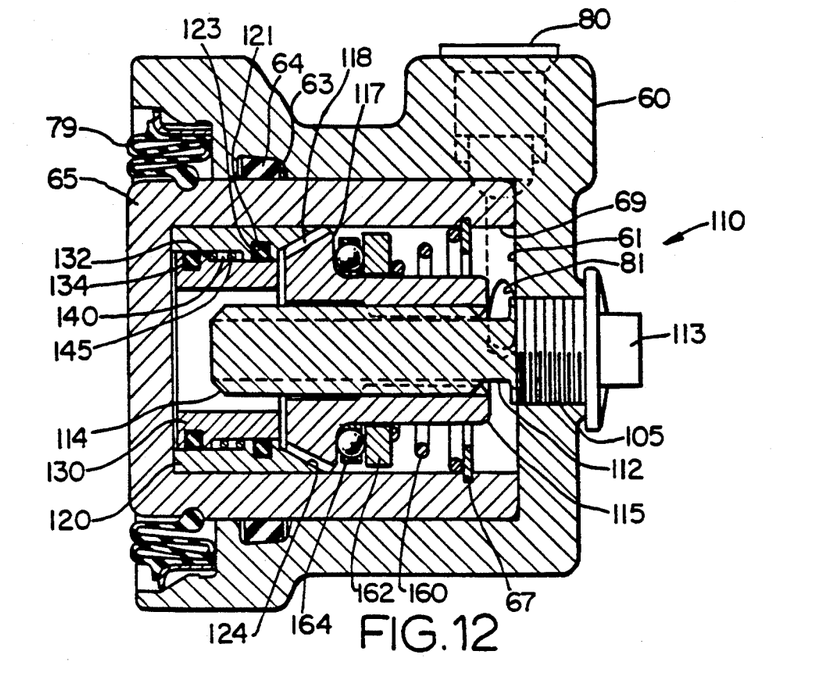
FIG. 12 is a schematic section view of the piston housing with the lining wear adjustment and pressure compensation mechanism in an at-rest position of the piston.
Figure 13:
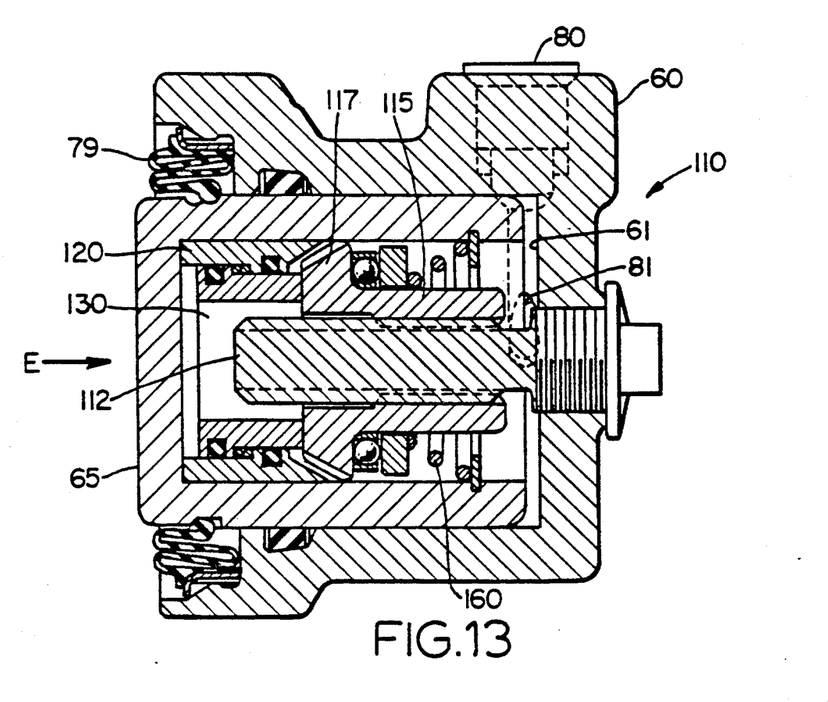
FIG. 13 is an illustration of the operation of the pressure compensation mechanism with the piston displaced from the piston housing.

Referring to FIGS. 11–13, a parking brake mechanism and lining wear adjustment and pressure compensation device will be explained in further detail. In FIG. 11, parking brake lever 100 is rotatably mounted on carrier 30 so that lever cam 102 is located adjacent an end 113 of screw 112 of the lining wear adjusting device. Lever 100 is biased by return spring 104 toward an at-rest position. Lever 100 may be rotated via a not shown parking brake cable in the direction of Arrow D in order to actuate the brake for a parking brake application. Referring to FIGS. 12 and 13, piston housing 60 includes interior bore 61 having piston seal recess 63 receiving therein retraction seal 64. A typical piston boot 79 extends between piston housing 60 and piston 65. Piston 65 includes interior opening 69 which includes a lining wear adjustment and pressure compensation device indicated generally by reference numeral 110. Device 110 includes screw 112 which extends through piston housing rear opening 105 to screw end 113 which is engaged by lever cam 102. Screw 112 includes threads 114 which engage the threads of nut 115. Nut 115 includes flange 117 with fluid passage recesses 118. Piston 65 includes piston clip 67 forming a base for resilient means or spring 160. Resilient means 160 biases washer 162 which engages the back of bearing member 164. Bearing member 164 bears against flange 117 of nut 115. Located within piston bore 61 is outer cylindrical collar 120 having an interior located seal 121. Collar 120 includes collar shoulder 123 and an angled or cone surface 124. Outer collar 120 comprises typically a cone clutch in its engagement with flange 117 of nut 115. Inner collar 130 comprises a cylindrical member having collar shoulder 132 with adjacent seal 134 which slidably and sealingly engages outer collar 120. Collar 130 slidably and sealingly engages seal 121 of outer collar 120. Located between the inner and outer collars is collar chamber or compressible air pocket 140. Because chamber 140 does not have a vent and is sealed by seals 121 and 134, it comprises a compressible air pocket. Return spring 145 is located within chamber 140.

When hydraulic pressure enters bore 61 via inlet fitting 80 and passage 81, piston 65 is displaced outwardly into engagement with inner brake pad 70. As brake pads 70, 76 wear, piston 65 moves further outwardly relative to bore 61, and each time piston 65 moves outwardly the engagement force between collar cone surface 124 and flange 117 of the nut is reduced so that nut 115 can rotate relative to the screw as it is biased outwardly in the direction of sliding piston 65 by means of resilient spring 160. However, it is important that adjustment device 110 not overadjust in case there is an excessive amount of hydraulic pressure transmitted to bore 61. As illustrated in FIG. 13, when excessive hydraulic pressure is transmitted to bore 61, the inner collar 130 is moved by hydraulic pressure in the direction of Arrow E so that collar 130 abuttingly engages nut 115 and keeps the nut from rotating relative to screw 112 while outer collar 120 disengages from nut flange 117. Thus, over-adjustment of the nut relative to the screw is prevented during a high pressurization situation. Referring to FIG. 11, when the vehicle operator wishes to operate the parking brake, the vehicle operator would effect actuation of the not shown parking brake cable which would pivot parking brake lever 100 in the direction of Arrow D. Cam part 102 engages screw exterior end 113 to bias screw 112 and housing 60 such that piston 65 is displaced against inner brake pad 70 and causes the inner and outer brake pads 70, 76 to engage rotor 11.

Figure 14:
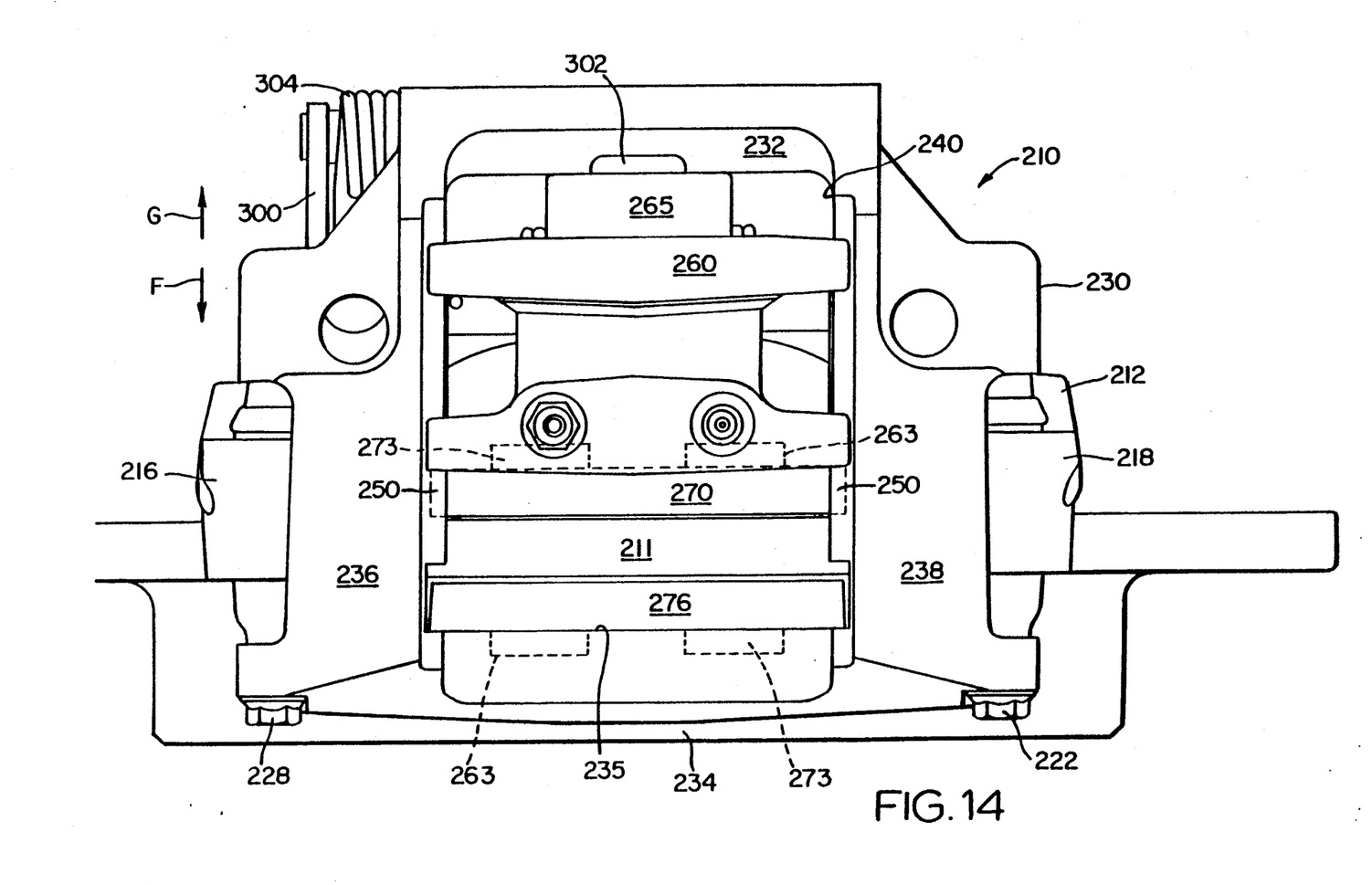
FIG. 14 is an illustration of a second embodiment of the modular disc brake which has brake pads that do not have any shoe or backing plates.
Figure 15:
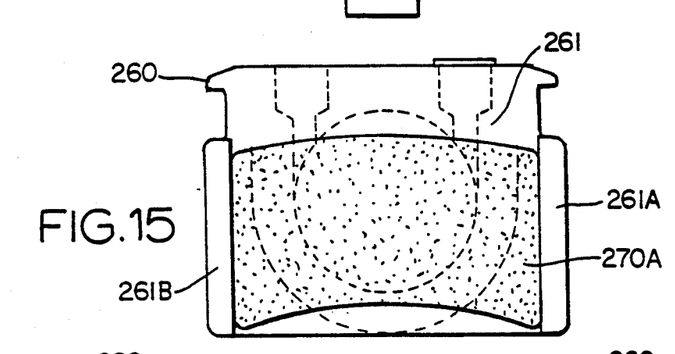
FIGS. 15-17 are embodiments of the brake pads which do not have shoe or backing plates.
Figure 16:
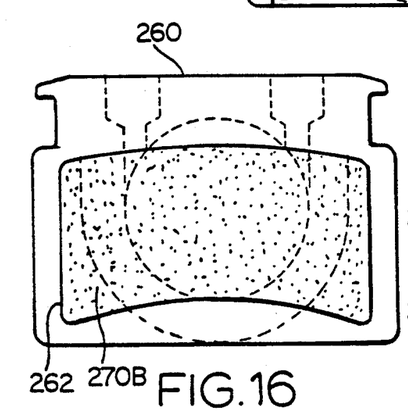
Figure 17:
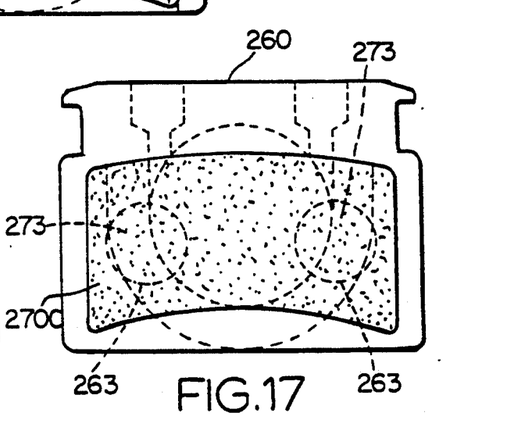

Referring now to FIG. 14, a second embodiment of the modular disc brake is designated generally by reference numeral 210. Modular disc brake 210 comprises the same disc brake as illustrated in FIGS. 1, 2 and 11 with the same components identified by the same number increased by 200; however, the piston housing is reversed so that piston 265 extends against inboard side 232 and causes piston housing 260 to slide axially in the direction of Arrow F. As piston housing 260 slides axially in the direction of Arrow F, inner shoeless friction puck 270 engages rotor 211 and causes, by reaction, the carrier 230 to slide in the direction of Arrow G and bring outer shoeless friction puck 276 into engagement with rotor 211. Because piston housing 260 is located closer to rotor 211 and piston 265 is stationary, the inboard arms of housing 260 do not engage the detent protrusions (58 in FIGS. 7 and 9) of sliders 250. Disc brake 210 includes a parking brake mechanism comprising parking brake lever 300 which is mounted to carrier 230 and rotatable to engage cam 302 with piston 265, such that piston 265 and piston housing 260 are displaced when lever 300 is rotated. Modular disc brake 210 also includes a lining wear adjustment and pressure compensation device as illustrated in FIGS. 12 and 13, with the only modification being that screw 112 need not extend exteriorly of piston housing 260, because cam 302 of lever 300 engages piston 265. As illustrated in FIGS. 15–17, shoeless friction pucks 270 and 276 may take various forms. First, piston housing wall 261 may include a pair of approximately vertical abutments 261A, 261B which receive the friction puck 270A and maintain it circumferentially in position relative to housing 260. Abutments 261A, 261B are angled slightly toward one another at their bottoms so that puck 270A is trapped therebetween to prevent radial movement. Additionally, as illustrated in FIG. 16, housing 260 may include housing recess 262 for receiving therein the friction puck 270B. FIG. 17 illustrates that housing 260 may include a pair of circular recesses 263 which receive axially extending nibs 273 molded into the friction puck 270C. The structures in FIGS. 15–17 for connecting inner shoeless friction puck 270 with piston housing 260 can be identical to or different from the structure for connecting outboard friction puck 276 with wall 235 of outboard side 234 (see FIG. 4).

The modular disc brakes disclosed herein provide substantial advantage over prior disc brake designs. The slide-in piston housing provides for design flexibility wherein the bore of the piston housing can be changed and comprise various sizes. The modular disc brake provides for simplified servicing with easy brake pad replacement and rotor access by means of removing only the small diameter pin 28. When pin 28 is removed, carrier 30 may be pivoted about large diameter pin 22. The traditional anchor plate utilized for many disc brakes is eliminated and this permits rotor size flexibility. Support plate 12 can be mounted directly to the knuckle or via an adapter plate. Because separate components are utilized for the modular disc brake, such as the aluminum piston housing and aluminum carrier, there is a greater flexibility in material selection. The modular disc brake also provides a disc brake caliper with integral parking mechanism. The parking mechanism reacts either directly on the adjustment screw or on the piston housing to create a parking clamp force. Because of the extensive use of aluminum in the piston housing, piston, and support member 12, the modular disc brake is very light weight and yet provides a very stiff, strong carrier 30. The piston housing can be easily changed so that a different diameter piston is utilized, and this enables the modular disc brake to be applied to a wide range of vehicles. Additionally, the braking balance of a vehicle can be easily modified by merely changing the piston bore size.

Sliders 50 also provide substantial advantages. The sliders are made of anti-corrosion stainless steel which provides for protection against outdoor elements and contaminants when utilized on the aluminum rail of the carrier. The sliders provide for a low slide force so that the steel shoe plates of the brake pads experience low friction during sliding. The detent extensions provide for retention of both the outer brake pad and the piston housing. Because the outer brake pad is retained by the sliders, this eliminates the need for a separate outer pad clip.

We claim:

1. A modular disc brake, comprising a support member having a central opening and a pair of pin support portions with pin openings, a carrier slidably attached to the support member by means of two pins, the carrier straddling the pin support portions and receiving fixedly both of said pins, one of said pins having a larger diameter than the other of said pins, the larger diameter pin extending through and slidably received within an associated pin opening, the other of said pins extending through and slidably received within an associated pin opening by means of a sleeve member, the sleeve member having a through opening receiving the other pin and the through opening being disposed eccentrically relative to a central longitudinal axis of said sleeve member, the through opening narrowing progressively radially inwardly toward a central axial portion of said sleeve member to provide substantially a central axial point of contact with said other pin, the carrier having inboard and outboard sides and circumferentially spaced apart sides to form a carrier opening, a piston housing comprising a module received slidably by said carrier within said carrier opening, the piston housing including a slidable piston, one of said carrier and piston housing having slide abutments and the other of said carrier and piston housing having slide recesses.

2. The disc brake in accordance with claim 1, wherein the slide abutments comprise a pair of laterally extending rail members each having radially upper and lower surfaces for engagement with complementary shaped upper and lower surfaces of the respective slide recess.

3. The disc brake in accordance with claim 2, wherein at least one brake pad slider is disposed over one of said rail members in order to increase the slidability of said piston housing.

4. The disc brake in accordance with claim 3, wherein said one rail member includes a connecting surface which is disposed at an angle relative to the associated radially upper and lower surfaces, the angle causing said slider to be deformed toward the vertical surface and effect an anti-rattle biasing reaction force against brake pads of the brake.

5. The disc brake in accordance with claim 3, wherein said brake pad slider comprises a generally U-shaped axially extending metal member, the metal member having a pair of vertically extending slots with laterally extending tabs adjacent the slots in order to position the slider axially relative to the carrier.

6. The disc brake in accordance with claim 5, wherein the slider includes at one axial end a detent protrusion which engages and retains an outer brake pad in axial position relative to the carrier.

7. The disc brake in accordance with claim 6, wherein an opposite end of the slider includes a detent protrusion which retains the piston housing in axial alignment relative to the carrier.

8. The disc brake in accordance with claim 2, wherein the rail members are disposed on said carrier and the recesses are located within said piston housing and brake pad backing plates of brake pads.

9. The disc brake in accordance with claim 8, further comprising a pair of pin boots disposed about each of said pins, the pin boots located on each axial side of the pin support portions and extending to the carrier in order prevent the entrance of contaminants within said pin openings.

10. The disc brake in accordance with claim 9, wherein the sleeve member has a groove at each axial end thereof which receives a pin boot of the associated pair of pin boots.

11. The disc brake in accordance with claim 9, wherein said pins are fixedly attached to the carrier by means of one of a threaded nut engaging a threaded end of each respective pin and carrier threads engaging a threaded end of each respective pin.

12. The disc brake in accordance with claim 11, wherein the larger diameter pin comprises the leading pin so that braking torque is substantially absorbed by the larger diameter pin.

13. The disc brake in accordance with claim 2, wherein each of the rail members includes a pair of axially spaced apart circumferentially extending openings so that lateral arms of disc brake pads and said piston housing may be received therethrough during assembly of the brake.

14. The disc brake in accordance with claim 13, wherein each of the circumferentially extending openings comprises vertical slots in said rail members.

15. The disc brake in accordance with claim 1, further comprising a brake lining wear adjustment device within said piston housing, the adjustment device comprising a screw and nut mechanism located within a piston and the nut engaging an outer collar member, an inner collar member located within the outer collar member and having resilient means disposed therebetween and located between axially spaced apart seals engaging the collar members so that an interior chamber containing the resilient means comprises a compressible air pocket.

16. The disc brake in accordance with claim 15, wherein the outer collar member comprises a cone clutch member which engages said nut that is biased by second resilient means into engagement with the outer collar.

17. The disc brake in accordance with claim 15, wherein said screw extends sealingly through a rear opening within said piston housing.

18. The disc brake in accordance with claim 17, wherein said disc brake includes a parking brake mechanism, the parking brake mechanism comprising a lever mounted rotatably on said carrier and having a cam engaging a portion of the screw which extends exteriorly of said piston housing.

19. The disc brake in accordance with claim 18, further comprising a spring mounted on said carrier and biasing said lever toward an at-rest position.

20. The disc brake in accordance with claim 1, wherein the piston housing is disposed such that the piston of said housing engages said inboard side.

21. The disc brake in accordance with claim 20, wherein said disc brake includes a parking brake mechanism, the parking brake mechanism comprising a lever mounted rotatably on said carrier and having a cam for displacing said piston.

22. The disc brake in accordance with claim 21, further comprising a spring mounted on said carrier and biasing said lever toward an at-rest position.

23. The disc brake in accordance with claim 20, wherein disc brake pads of the brake are mounted directly on said piston housing and said outboard side, respectively.

24. The disc brake in accordance with claim 23, wherein the piston housing includes a pair of substantially vertical abutments which engage radially extending sides of the associated brake pad in order to position said brake pad on the piston housing.

25. The disc brake in accordance with claim 23, wherein the piston housing includes a housing recess which receives therein the associated disc brake pad in order to position the disc brake pad relative to the piston housing.

26. The disc brake in accordance with claim 23, wherein one brake pad includes a pair of axially extending nibs which are received within correspondingly shaped recesses within the housing in order to position the one brake pad relative to said housing.

27. The disc brake in accordance with claim 1, wherein the sleeve member slides axially relative to the respective pin support portion.

28. A parallel slider mechanism for carrier means of a disc brake which includes a support member with a pair of pin support portions with pin openings, the carrier means slidably attached to the support member by the slider mechanism which comprises two pins received fixedly by the carrier means, one of said pins extending through and slidably received within an associated pin opening, the other of said pins extending through and slidably received within an associated pin opening by means of a sleeve member, the sleeve member having a through opening receiving the other pin and the through opening being disposed eccentrically relative to a central longitudinal axis of said sleeve member, the through opening narrowing progressively radially inwardly toward a central axial portion of said sleeve member to provide substantially a central axial point of contact with said other pin and the sleeve member axially slidable relative to the respective pin support portion, such that the one pin and sleeve member remain substantially parallel with one another during operation of the brake.

29. The parallel slider mechanism and disc brake in accordance with claim 28, wherein a piston housing, with a piston, comprises a module received slidably by said carrier means, one of said carrier and piston housing having slide abutments and the other of said carrier means and piston housing having slide recesses.

30. The parallel slider mechanism and disc brake in accordance with claim 29, wherein the piston housing and piston include a brake lining wear adjustment device.

31. A modular disc brake, comprising a support member having a central opening and a pair of pin support portions with pin openings, a carrier slidably attached to the support member by means of two pins, the carrier straddling the pin support portions and receiving fixedly both of said pins, one of said pins having a larger diameter than the other of said pins, the large diameter pin extending through and slidably received within an associated pin opening, the other of said pins extending through and slidably received within an associated pin opening by means of a sleeve member, the sleeve member having a through opening receiving the other pin and the through opening being disposed eccentrically relative to a central longitudinal axis of said sleeve member, the through opening narrowing at a central axial portion of said sleeve member to provide substantially a point of contact with said other pin, the carrier having inboard and outboard sides and circumferentially spaced apart sides to form a carrier opening, a piston housing comprising a module received slidably by said carrier within said carrier opening, one of said carrier and piston housing having slide abutments and the other of said carrier and piston housing having slide recesses, a brake lining wear adjustment device disposed within said piston housing, the adjustment device comprising a screw and nut mechanism located within a brake piston and the nut engaging an outer collar member, an inner collar member located within the outer collar member and having resilient means disposed therebetween and located between axially spaced apart seals engaging the collar members so that an interior chamber containing the resilient means comprises a compressible air pocket, and a parking brake mechanism, the parking brake mechanism comprising a lever mounted rotatably on said carrier and having a cam for effecting displacement of said piston housing toward a rotor. piston, one of said carrier and piston housing having slide abutments and the other of said carrier and piston housing having slide recesses.

32. A modular disc brake, comprising a support member having a central opening and a pair of pin support portions with pin openings, a carrier slidably attached to the support member by means of two pins, the carrier straddling the pin support portions and receiving fixedly both of said pins, one of said pins having a larger diameter than the other of said pins, the larger diameter pin extending through and slidably received within an associated pin opening, the other of said pins extending through and slidably received within an associated pin opening by means of a sleeve member, the sleeve member having a through opening receiving the other pin and the through opening being disposed eccentrically relative to a central longitudinal axis of said sleeve member, the through opening narrowing progressively radially inwardly toward a central axial portion of said sleeve member to provide substantially a central axial point of contact with said other pin, the carrier having inboard and outboard sides and circumferentially spaced apart sides to form a carrier opening, a piston housing comprising a module received slidably by said carrier within said carrier opening, the piston housing having a slidable piton, one of said carrier and piston housing having slide abutments and the other of said carrier and piston housing having slide recesses, and disc brake pads which are connected directly and respectively with the piston housing and outboard side for engagement with a rotor.

* * * * *